E. S. PHELPS.
RECORDER.
APPLICATION FILED NOV. 20, 1913.
1,198,953.
Patented Sept. 19, 1916.
2 SHEETS—SHEET 2.
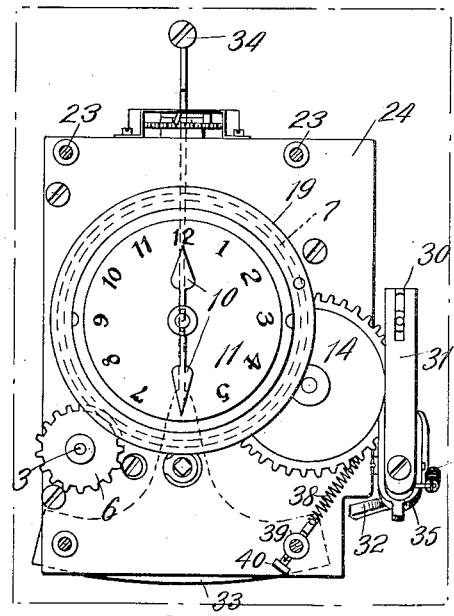
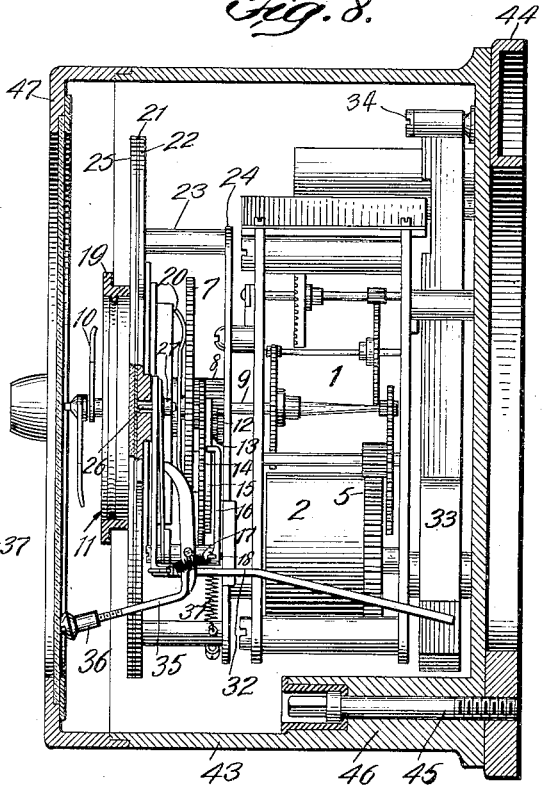
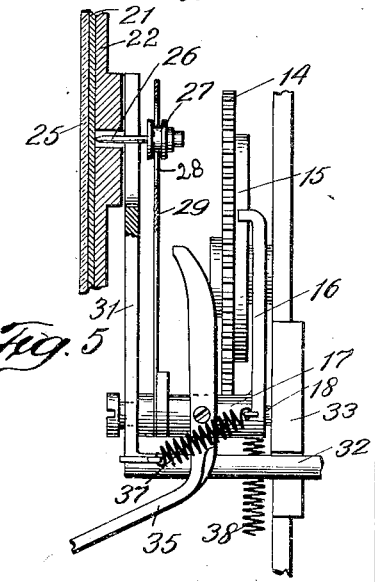
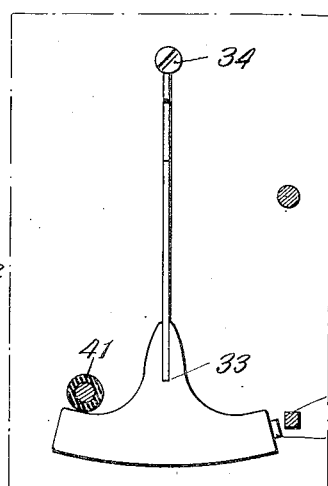
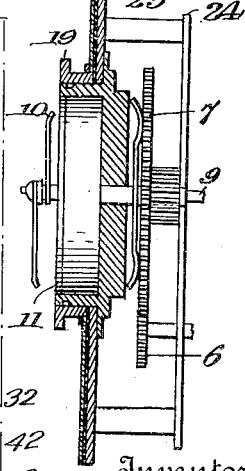

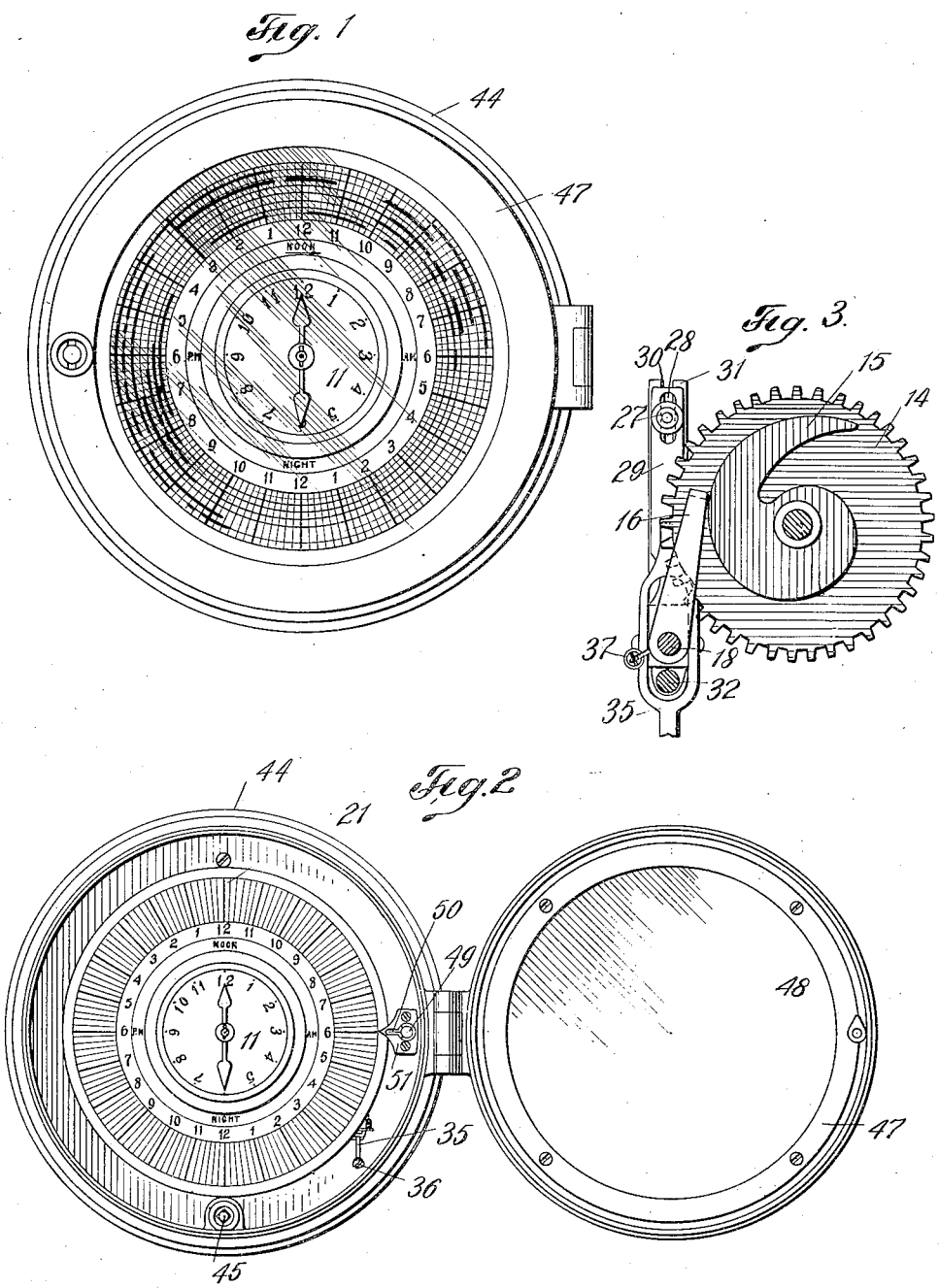

UNITED STATES PATENT OFFICE.

EDWIN SANFORD PHELPS, OF ELIZABETH, NEW JERSEY.

RECORDER.

1,198,953.  Specification of Letters Patent.  Patented Sept. 19, 1916.

Application filed November 20, 1913. Serial No. 802,098.

*To all whom it may concern:*

Be it known that I, EDWIN S. PHELPS, a citizen of the United States, residing at Elizabeth, in the county of Union and State of New Jersey, have invented certain new and useful Improvements in Recorders; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to recorders designed more particularly for vehicles, and of the type that indicates the period of time during which the vehicle is at rest as well as the period when it is running.

One object of the present invention is to provide a construction embodying a plurality of dials, one of which will indicate the time of day and the other indicate the record made of the period of running and the period of not running the vehicle, both dials being observable from the front or face of the inclosing case, and thus made to serve the two-fold function mentioned and affording the advantages resulting therefrom.

Another object is to enable the recording receiving portion or member of the recording dial to be placed and adjusted to the position of the time of day when placed on the instrument without the marking point making an inscription on the receiving member until after the adjustment has been effected and the cover or door of the case has been closed whereupon the marker will begin to discharge its function of making an inscription or mark upon the receiving dial.

Another object is to provide a construction in which the pendulum of the instrument by impact against a member during the period that the vehicle is in motion will move the marker or scribe so as to cause it to make a heavier or differentiating mark from that made while the vehicle is at rest or not running together with means which will cause the marker or scribe to assume and stand in proper relation to the record receiving member as to insure the proper marking thereon when the vehicle is at rest.

To the accomplishment of the foregoing and said other objects as may hereinafter appear the invention consists in the features hereinafter particularly described and then sought to be clearly defined by the claims, reference being had to the accompanying drawings forming a part hereof, and in which—

Figure 1 is a front view of the recorder with the two dial faces, showing markings on record receiving dial; Fig. 2 is a similar view with transparent cover or face thrown open, and showing recording dial before inscription or markings have been made; Fig. 3 is a detail view of marker or scribe and actuating snail; Fig. 4 is a face view of a recorder with parts omitted; Fig. 5 is a detail view showing marker and portion of record receiving dial, partly in section; Fig. 6 is a front view of pendulum; Fig. 7 is a detail of recording dial carrying hub and glass or celluloid covering, in section and parts broken away; Fig. 8 is a side view of the recorder with the inclosing case and other parts in section.

In the drawings the numeral 1 designates a train of clock mechanism of a desired type and from the spring-barrel 2 of which a shaft 3 carrying at one end a pinion meshing with the toothed wheel 5 of the barrel and at the other end a pinion 6 meshing with a gear wheel 7 at one side of which is a pinion 8 both of which are mounted so as to rotate together on a shaft 9 on which is mounted the clock hands 10 actuated as ordinarily from the clock mechanism, a fixed time indicating dial 11 being suitably supported in relation to said hands as usual in time-pieces.

The pinion 8 transmits motion to a pinion 12 having an attached pinion 13 which meshes with a gear wheel 14 which has affixed to one face a snail 15, preferably of the form shown, and against the periphery of which bears one end of an arm 16 which at the other end is attached to a sleeve 17 supported on a spindle or shaft 18 so as to turn thereon.

The shaft 9 also carries a dial carrying plate or hub 19 which rotates with the gear wheel 7 and pinion 8 and to that end is connected with said parts in any suitable or well known way, for instance by spring fingers 20 which will hold the gear wheel 7, pinion 8 and dial plate together by frictional contact. This dial plate or hub carries the record receiving dial 21 which preferably is made of sensitized paper so that markings will be made thereon by the scribe or marker to be presently described. This sensitized paper is of the well-known kind in which an impression made on one surface is observable on the other surface of the paper. For this record receiving dial I provide a backing-plate 22 supported by posts 23 from a frame 24 suitably supported, and over the exposed or outer face of the record receiving dial I place a plate of glass, or celluloid or other suitable transparent material 25, so that the markings made on the dial may be observed. This transparent face plate may be attached to the record carrying plate or hub in any suitable way. The record receiving dial of sensitized paper is removable from its carrying plate or hub and is provided with numerals $a$ indicating hours of the day and subdivided into spaces representing fractions of hours, and being carried by the hub or plate at the front of the device with the hour designating numerals exposed, the record showing the periods of running as well as the period of not running the vehicle and the hours and fractions thereof is readable from the front face of the instrument; and the time of the day is also readable from the front face of the instrument as indicated by the time dial and hands of the clock mechanism. This feature of arranging the time dial and the record dial so that both may be observed and read from the front face of the instrument is an important feature of the invention as it brings both dials at the front of the instrument so that both may be observed at the same time, and avoids the necessity of removing a portion of the operating mechanism to gain access to the record dial, and also makes it possible to contain the entire mechanism in a smaller space which is desirable as it is a disadvantage to occupy any more space than absolutely necessary on the front of a dashboard of a vehicle to which the instruments are usually attached. I have illustrated the record dial as circumscribing the time dial and while this is the preferable form yet the invention in its generic character contemplates two exposed dials at the face of the instrument, one a record dial and the other a time dial whatever be the relative arrangement or relation one to the other.

The markings are made on the sensitized paper of the record dial by a marking point or scribe 26 which in the present instance consists of a pin having a collar 27 fitting loosely so as to move in a slot 28 of a spring support 29 sustained on the shaft 18 so as to turn with the sleeve 17 of the snail arm 16, the pin also passing through a slot 30 formed in a guide-bar 31 supported so as to turn on the shaft 18, and also through an opening formed in the back-plate 22 as shown in Figs. 5 and 8, said bar 31 having a rod or lever 32 extending therefrom to a point in the path of the movement of an oscillating pendulum 33 which is suspended to swing from a post 34. The spring support 29 will hold the marking pin out of contact with the sensitized record dial, or let it bear so slightly against it as not to make a mark, except when the cap or cover of the instrument is closed, so that the dial and its supporting hub or plate may be adjusted circularly to bring the scribe to its proper recording position. When however the cap or cover is closed it will bear against the end of a presser finger 35 pivoted to the sleeve 17 and turn the finger so that its point will bear against and press forward the spring support 29 as indicated in Fig. 8 so as to cause the point of the pin to press with marking contact against the sensitized paper record dial. One end of the presser finger is threaded and has an adjusting knob 36 thereon so that the extent of throw of the finger can be regulated. A spring 37 attached at one end to the sleeve 17 and at the other end to the guide 31 will restore the guide to its normal position after the pendulum has struck and receded from the extension lever of the guide, and it will also restrain and hold the marking pin in proper position to make a fine line on its proper involute curve when the vehicle is at rest or not running. The slot 28 in the spring support 29 and in the guide 31 are also proportioned so that the marking pin will be restrained so as to prevent the heavier lines made during the running of the vehicle from interfering with the similar lines of another involute curve and also from interfering with or confusing the light lines of another involute curve, and thus the legible and ready reading of all the markings is preserved.

A spring 38 attached at one end to the sleeve 17 and at the other end to a post 39 by an adjusting screw 40 holds the arm 16 against the periphery of snail 15 by a yielding pressure.

A rubber faced post 41 is in the path of the swing of the pendulum to limit its stroke and deaden the noise of impact, and a rubber cushion 42 may be fitted in one end of the pendulum to soften its impact against the extension lever 32 of the guide bar 31.

The several parts described are contained in a shell or casing 43 which will be detachably secured by a bayonet-joint or other suitable fastening (not illustrated) to a base-ring 44 which will be bolted or otherwise suitably secured to the dash of a vehicle or other body; and a threaded bolt 45 will then be passed through a boss 46 formed inside the casing and into a threaded opening of the base-ring 44, as shown in Fig. 8 so as to lock the casing and ring together. This shell or casing is provided with a suitable cap or cover 47 which may be hinged to the shell and provided with any suitable lock and which also will have a transparent face 48 through which the time dial and the record dial may be observed as shown in Fig. 1.

For the purpose of making a record of each time the casing is opened a spring actuated plunger 49 carrying a cutter 50 is located so that when the cap is closed it will strike the plunger and depress the cutter so as to slit the edge of the paper record dial and thus make an indication of the time of closing the cover. When the cover is opened the spring of the plunger will project the latter so that the cutter will slit the paper dial and indicate the time of opening the cover. When the cover is closed the cutter is depressed back from the paper dial so as not to interfere with the movement of the dial. The plunger and cutter may operate through a plate or shield 51. The details of the plunger and cutter are not illustrated because not claimed.

When the sensitized paper record dial has been placed in position on its carrying hub or plate and adjusted for the hour of the day at which the making of the record is to begin, which adjustment is effected by turning the hub or plate till the hour and fractional hour marking thereon corresponds to the time indicated by the time dial (the cover of the casing being open and the scribe out of marking position), the cap or cover is then closed which operation presses the scribe pin into marking contact with the sensitized paper and the recording then begins. If the vehicle is at rest a thin unbroken curved line is inscribed on the dial until the vehicle is started to run. Thereupon the pendulum swings and striking the extension lever of the guide bar moves the latter so that the scribe or marking pin is caused to vibrate so as to make a heavier line which continues to be made during the running of the vehicle, and when the vehicle comes to a rest a thin line is again inscribed as the pendulum then ceases to oscillate or swing and the heavier line is made only during the swinging of the pendulum. The snail which moves continuously gradually lifts the arm resting thereon and through its described connection with the marking pin the latter is gradually raised on an involute curve, one entire curve being made in each revolution of the record dial, and the succeeding curve beginning immediately upon completion of its predecessor, and so on through the period of seven days. The snail is so proportioned that in making one complete revolution there will be seven involute convolutions described upon the paper record dial, some of which will be light indicating when the car was not running, and others, heavy, indicating when the car was running; the marking scribe gradually advancing with each convolution from the one nearest the center of the dial finally to the one nearest the outer circumference of the dial, and at the termination of the final convolution the arm will pass off from the end of the snail and assume its position in relation thereto to begin the record of a succeeding week without any readjustment of parts.

While it is preferable to make a series of continuous successive involute convolutions as described yet it will be apparent that the features of the invention are not limited thereto; and furthermore that whatever may be the relative arrangement of the time dial and the record dial the primary character of the present invention will be contained where the two dials are exposed to observation at the same face of the instrument for the purpose of making readily observable the time of the day as well as the record made of the period of rest and of travel of the vehicle.

I have illustrated what I consider the best embodiment of the invention and the preferred construction of the various parts but changes can be made without departing from the essentials of the invention.

If desired the slitter or cutter 50 may be so formed or shaped as to make a V shaped slit or cut in the paper dial.

Since the means for attaching the case 43 to base ring 44 is contained within the case it is not accessible without opening the case, and inasmuch as the paper dial is slitted or cut in opening the cover to the case and a record thus made, it is clear that the instrument cannot be removed without first opening the case and when that is done a record is made so that the user or owner is given knowledge of the removal or attempted removal of the instrument and thus a check is afforded against fraudulent removal or tampering with the instrument.

Having described my invention and set forth its merits, what I claim is—

1. In a recorder, a record-receiving dial, means for rotating said dial, means for inscribing on said dial, a time indicating dial, said dials being disposed for simultaneous observation of both dials, a pendulum, and means connected with the inscribing means and having a part positioned in the path of swing of the pendulum for intermittent action by the pendulum.

2. In a recorder, a record-receiving dial, means for rotating said dial, means for inscribing on said dial, a time-indicating dial, one of said dials being rotatable relatively to the other and both being disposed for simultaneous observation, an inclosing case provided with a door, and means operatively disposed relatively to the door and inscribing means to move the inscribing means into operative relation to the record-receiving dial when the door is closed.

3. In a recorder, a record-receiving dial, means for inscribing on the rear of said dial, a time-indicating dial, said record-receiving dial and time-indicating dial being disposed for simultaneous observation, one of said dials circumscribing the other, a transparent covering bearing against the exposed face of the record-receiving dial, and means for rotating the record-receiving dial relatively to the time-indicating dial.

4. In a recorder, a record-receiving dial, a marking element supported to contact with said dial for inscribing thereon, a guide for said marking element, a swinging pendulum, and a lever extending from said guide to within the path of swing of the pendulum and with which the pendulum intermittently engages to move the guide to vibrate the marking element.

5. In a recorder, a record-receiving dial, a marking element and support therefor in which the element is movable, a guide for said marking element, a swinging pendulum, and a lever extending from said guide to within the path of swing of the pendulum and with which the pendulum intermittently engages to move the guide to oscillate the marking element in its support.

6. In a recorder, a record-receiving dial, a marking element for inscribing on the dial, a guide for the marking element, means for moving said guide to vibrate the marking element, and retractile means connected with the guide to confine the marking element within restricted limits.

7. In a recorder, a record-receiving dial, means for continuously moving said dial, a marking element for inscribing on the dial, a spring support for the marking element operative to retract the marking element from inscriptive position under some conditions, and means for shifting the spring support to bring the marking element into inscriptive position under operative conditions.

8. In a recorder, a record-receiving dial, means for continuously moving said dial, a marking element for inscribing on the dial, a support for the marking element, said support being operative under some conditions to hold the marking element from inscriptive position, means for shifting the support to move the marking element into inscriptive position under operative conditions, and means for holding the support in such position.

9. In a recorder, a record-receiving dial, a marking element for inscribing on the dial throughout the period that the cover to an inclosing casing is closed, a support for the marking element, means for continuously moving the record-receiving dial, a casing inclosing said parts and having a cover, and a presser finger arranged in relation to the cover and marking element support to be actuated by the cover for moving the support and marking element into inscribing position on closing the cover.

In testimony whereof I affix my signature in presence of two witnesses.

EDWIN SANFORD PHELPS.

Witnesses:
 LOUIS ASLACH, Jr.,
 CLARA A. RYLEY.